United States Patent [19]

Bertelsen et al.

[11] 4,230,557
[45] Oct. 28, 1980

[54] REMOVAL OF ENTRAINED SOLIDS FROM RETORTED HYDROCARBONACEOUS VAPORS

[75] Inventors: Corey A. Bertelsen, Oakland; Byron G. Spars, Mill Valley, both of Calif.

[73] Assignee: Chevron Research Company, San Francisco, Calif.

[21] Appl. No.: 13,991

[22] Filed: Feb. 22, 1979

[51] Int. Cl.³ .......................... C10B 53/06; C10G 1/02
[52] U.S. Cl. ...................................... 208/8 R; 55/99; 201/20; 208/11 R
[58] Field of Search .............................. 208/11 R, 8 R; 201/20,

[56] References Cited

U.S. PATENT DOCUMENTS

| | | | |
|---|---|---|---|
| 3,252,886 | 5/1966 | Crawford | 208/11 R |
| 4,017,278 | 4/1977 | Reese | 55/96 |
| 4,056,461 | 11/1977 | Unverferth | 208/11 R |
| 4,087,347 | 5/1978 | Langlois et al. | 208/11 R |
| 4,160,719 | 7/1979 | Pollock | 208/11 R |

OTHER PUBLICATIONS

Hendrickson "Synthetic Fuels Data Handbook", 1975 pp. 80 to 82.
Schmidt et al., "Journal of the Air Pollution Control Association", vol. 28, No. 2, Feb. 1978, pp. 143 to 146.

Primary Examiner—Herbert Levine
Attorney, Agent, or Firm—D. A. Newell; M. K. Bosworth; R. H. Evans

[57] ABSTRACT

A combination of a retorting process with a granular filtration zone whereby finely divided solids are removed from hydrocarbonaceous vapors. Raw hydrocarbon-containing particles such as shale are retorted by contacting them with heat carrier particles, and the resulting hydrocarbonaceous vapors withdrawn from the retort are contaminated with entrained, finely divided solids. These solids are removed from the hydrocarbonaceous vapors by passing the contaminated vapors at substantially the retorting temperature transversely through a downwardly moving bed of solid contact material maintained at approximately retorting temperature. The solid contact material is selected from retorted solids, heat carrier particles and mixtures of them. The mixture of finely divided solids and contact material withdrawn from the granular filtration may be returned to the process.

10 Claims, 3 Drawing Figures

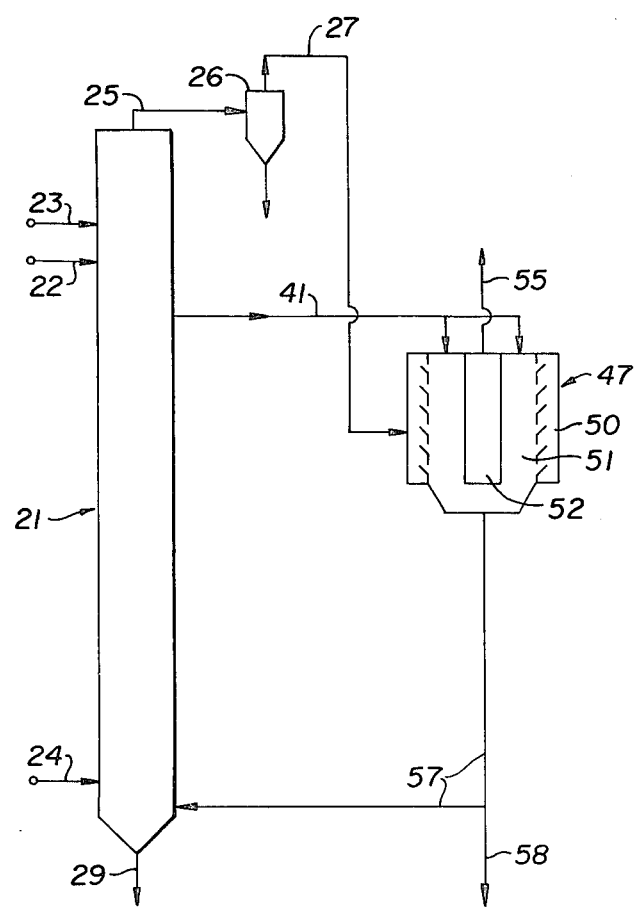
FIG._1.

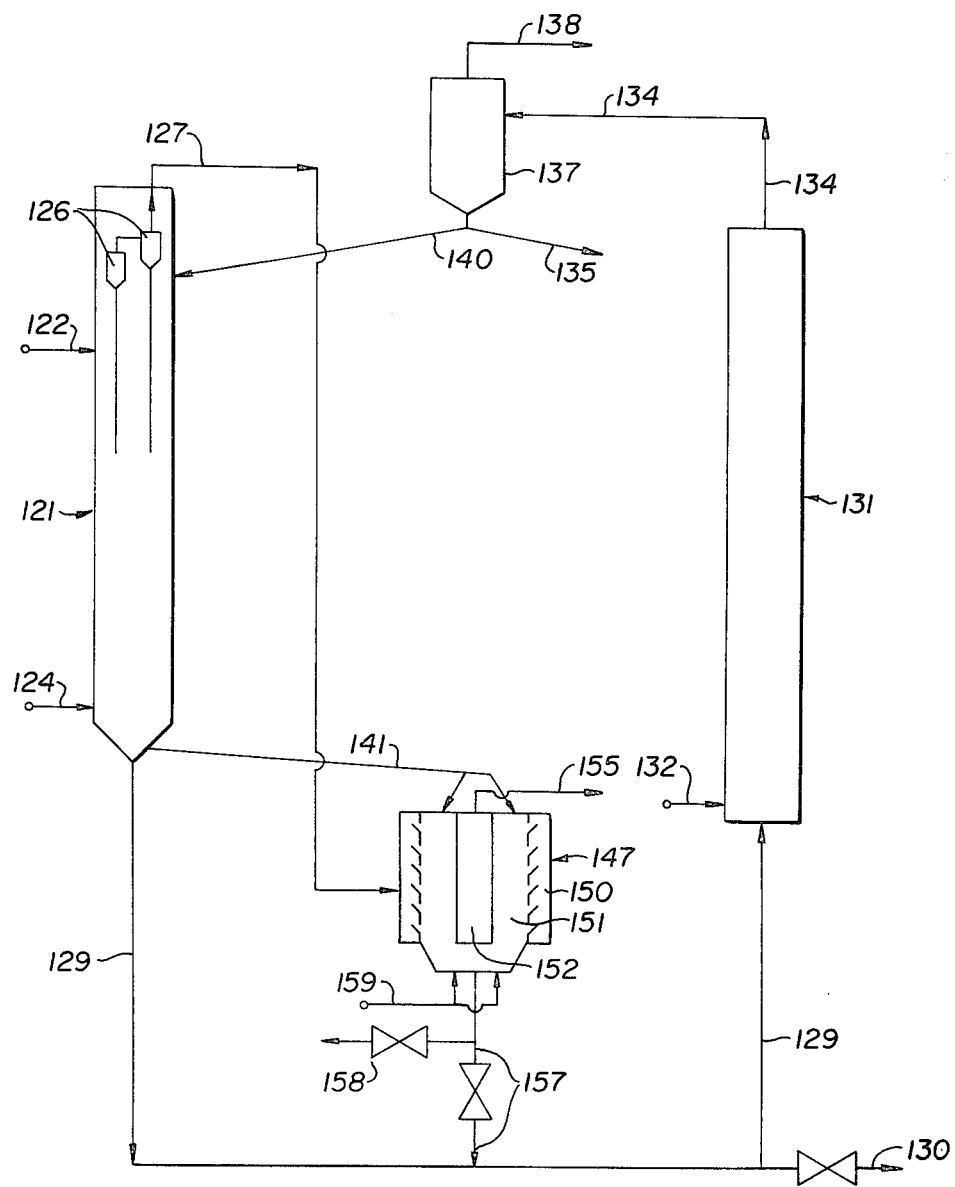
FIG._2.

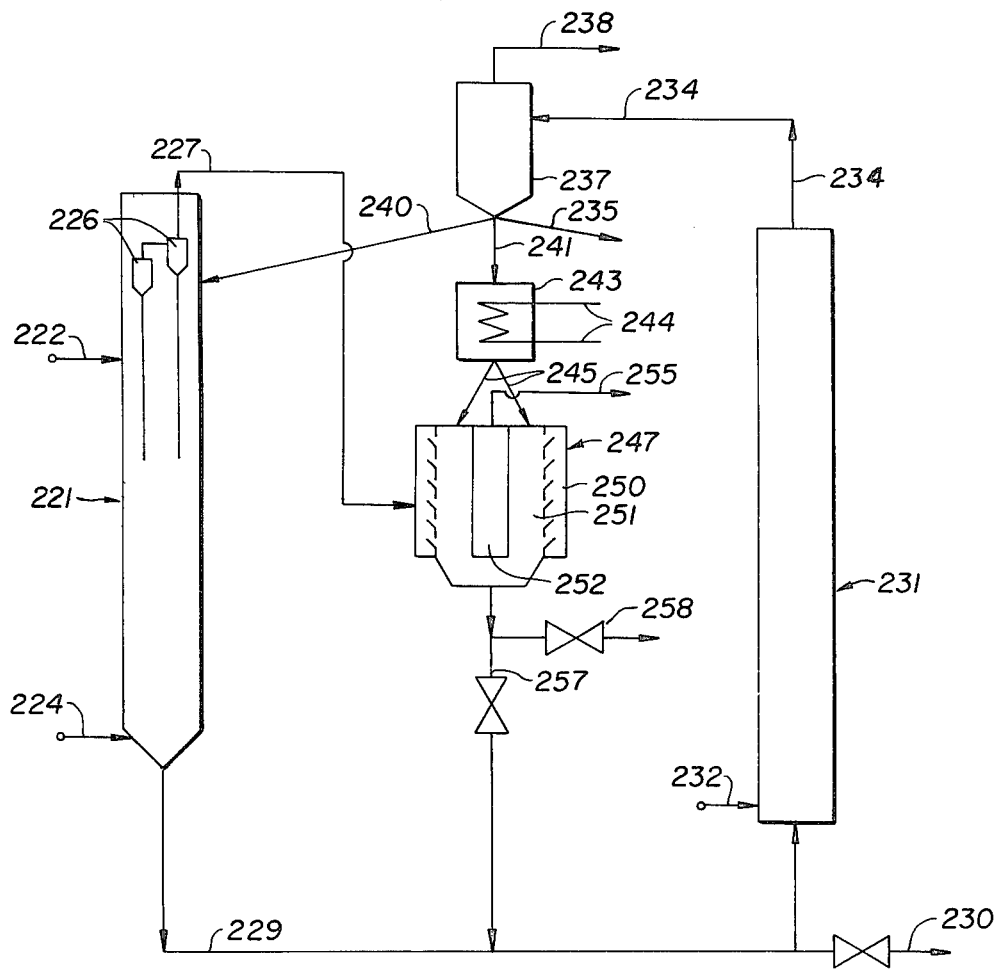
FIG._3.

REMOVAL OF ENTRAINED SOLIDS FROM RETORTED HYDROCARBONACEOUS VAPORS

FIELD OF THE INVENTION

This invention relates to a method for removing entrained fines from retorted hydrocarbonaceous vapors, for example shale oil vapors. In particular, the entrained particles are removed with solids taken from the retorting process.

BACKGROUND OF THE INVENTION

In recent years, increasing interest has been shown in recovering oil contained in oil shale and other similar hydrocarbon-containing solids by heating the solids to an elevated temperature in a retort to free the oil. In many of these processes, the oil is recovered from the retort in the form of a vapor and these vapors usually contain significant amounts of entrained shale fines. Some of the fines can be removed from the vapor by cyclone separators; however, the ultimate shale oil liquid still contains too high a concentration of entrained shale fines for acceptable downstream processing.

Particular examples of retorting processes include those described in U.S. Ser. No. 802,999, filed June 3, 1977, now U.S. Pat. No. 4,157,245 which discloses an indirectly heated retorting process in which fluidized heat carrier material flows countercurrently to entrained shale or coal particlees introduced at the bottom of the retort; U.S. Ser. No. 811,496, filed June 30, 1977, now U.S. Pat. No. 4,133,739 which discloses a directly heated retorting process in which fluidized heat carrier material flows downwardly and countercurrent to entrained hydrocarbon-containing particles introduced at an intermediate portion of the retort; U.S. Ser. No. 891,084, filed Mar. 28, 1978, now U.S. Pat. No. 4,183,800 which discloses an indirectly heated retorting process in which heat carrier material is fluidized and shale or coal particles, introduced at an intermediate portion of the retort, are fluidized in part and entrain in part (all to Mitchell et al); U.S. Ser. No. 889,156, filed Mar. 22, 1978 to Tamm et al, which discloses an indirectly heated retorting process in which fluidizable and non-fluidizable shale or coal particles and heat carrier particles are passed downwardly through a retort; U.S. Pat. No. 4,056,461 to Unverferth, which discloses an indirectly heated process in which hydrocarbon-containing particles are mixed with heat carrier particles and conveyed through an elongated retort by a rotating helical coil; U.S. Pat. No. 4,087,347 to Langlois et al., which discloses an indirectly heated shale retorting process in which shale particles are retorted with heat carrier material in a lift pipe and stripper vessel; U.S. Pat. No. 4,125,453 to Tamm et al, which discloses an indirectly heated shale retorting process in which shale particles are retorted with heat carrier material in a spouted bed; and the Lurgi Ruhrgas "Sand Cracker" process in which shale is retorted in a sealed screw-type conveyor, described in the Synthetic Fuels Data Handbook compiled by T. A. Hendrickson, Cameron Engineers, Inc., 1315 South Clarkson Street, Denver, Colo. 80210, pages 80–82. All of these disclosures are incorporated herein by reference.

One method which has been used for removing entrained particles from gases involves passing the gases through a granular filter bed, such as the one described in the article "Filtration Theory For Granular Beds" by Schmidt et al. in Journal of the Air Pollution Control Association, Volume 28, No. 2, pages 143–146 (February 1978). Commercial application of a granular bed is described in U.S. Pat. No. 4,017,278 to Reese, the substance of which is incorporated herein by reference. Reese describes passing a gas containing finely divided solids through an annular bed of solid contact material which traps the finely divided solids. The contact material containing the trapped, finely divided solids is withdrawn from the bottom of the bed and treated to remove the trapped, finely divided solids before being returned to the top of the granular bed. A large portion of the cost of operating a granular bed with recycled contact material is due to the necessity of treating the recycled contact material for removal of the finely divided solids.

SUMMARY OF THE INVENTION

The present invention provides a remarkably simple method for removing entrained, finely divided solids from retorted hydrocarbonaceous vapors such as shale oil vapors using a granular bed without the necessity for treating the contact material to remove the finely divided solids therefrom.

In accordance with one embodiment of this invention, there is provided in a retorting process wherein raw hydrocarbon-containing particles are introduced into a retorting zone and retorted therein to form retorted solids and hydrocarbonaceous vapors by heating said particles to retorting temperatures by heat transfer from solid heat carrier particles passed through the retorting zone, and a stream comprising said hydrocarbonaceous vapors contaminated with entrained finely divided solids is withdrawn from the retorting zone;

the improved method of removing at least a portion of said entrained finely divided solids from said hydrocarbonaceous vapor, which comprises:

(a) introducing solid contact material predominantly of a size in the range from 75 microns to 8 millimeters and at a temperature within the range from 25° C. (45° F.) below the retorting temperature to 55° C. (100° F.) above the retorting temperature to an upper portion of a granular filtration zone, said solid contact material being selected from the group consisting of retorted solids, heat carrier particles, and mixtures of retorted solids and heat carrier particles;

(b) passing said solid contact material downwardly by gravity flow through said filtration zone as a bed of contiguous particles at a velocity in the range of 7.6 to 1220 cm per hour ($\frac{1}{4}$ to 40 feet per hour);

(c) passing said stream at substantially said retorting temperature transversely through said bed whereby at least a portion of said finely divided solids is deposited in said bed; and (d) withdrawing a mixture of said contact material and said finely divided solids from a lower portion of said filtration zone.

Although the process is not limited thereto, the hydrocarbon-containing particles may comprise one or more of the following: oil shale, coal, tar sands and gilsonite, and the solid heat carrier particles may comprise previously retorted solids and refractory-type solids or mixtures of them.

According to another embodiment of the present invention, there is provided in a retorting process wherein raw hydrocarbon-containing particles are introduced into a retorting zone and retorted therein to form retorted solids and hydrocarbonaceous vapors by heating said particles to retorting temperatures by heat transfer from solid heat carrier particles passed through the retorting zone, a stream comprising hydrocarbonaceous vapors contaminated with entrained finely divided solids is withdrawn from the retorting zone, a stream of solids including heat carrier particles and retorted solids is withdrawn from the retorting zone and at least a portion of said solids stream, including solids containing residual hydrocarbonaceous material, is passed to a combustion zone and there contacted with an oxygen-containing gas under combustion conditions, thereby heating the solids stream, and the resulting heated solids are withdrawn from the combustion zone and at least a portion of said heated solids stream recycled as said heat carrier particles;

the improved method of removing at least a portion of said entrained finely divided solids from said hydrocarbonaceous stream which comprises:

(a) introducing solid contact material predominantly of a size in the range from 75 microns to 8 millimeters and at a temperaure within the range from 25° C. (45° F.) below the retorting temperature to 55° C. (100° F.) above the retorting temperature to an upper portion of a granular filtration zone, said solid contact material being selected from the group consisting of retorted solids, heat carrier particles, and mixtures of retorted solids and heat carrier particles;

(b) passing said solid contact material downwardly by gravity flow through said filtration zone as a bed of contiguous particles at a velocity in the range of 7.6 to 1220 cm per hour (¼ to 40 feet per hour);

(c) passing said stream at substantially said retorting temperature transversely through said bed whereby at least a portion of said finely divided solids is deposited in said bed; and (d) withdrawing a mixture of said contact material and said finely divided solids from a lower portion of said filtration zone.

Preferably, the mixture of contact material and finely divided solids is passed to said combustion zone.

DESCRIPTION OF THE FIGURES

FIG. 1 is a flow diagram of an embodiment of the present invention showing one arrangement of a granular filtration zone and a retorting zone.

FIG. 2 is a flow diagram of a preferred embodiment of the present invention showing an arrangement of a granular filtration zone, a retorting zone and a combustion zone.

FIG. 3 is a flow diagram of another preferred embodiment of the present invention showing an alternate arrangement of a granular filtration zone, a retorting zone and a combustion zone.

DETAILED DESCRIPTION

The invention will be further clarified by consideration of the Figures and the accompanying description thereof, which are intended to be purely exemplary of the use of this invention.

Referring to FIG. 1, there is shown retorting zone 21 into which shale particles crushed to less than 12 and advantageously less than 8 millimeters in size, with 90% being above 75 microns in size, are introduced via line 23 at a temperature from 70° to 600° F. (21° to 316° C.). Also introduced through line 22 into retorting zone 21 are heat carrier particles at a temperature from 900° to 1600° F. (482° to 872° C.), and usually from 1100° to 1500° F. (593° to 816° C.). The weight ratio of heat carrier solids to raw shale particles may be from 0.5:1 to 10:1 and is usually from 1:1 to 5:1, depending upon the amount and temperature of heat carrier solids necessary to maintain a retorting temperature from 800° to 1200° F. or more (427° to 649° C.), advantageously from 850° to 1000° F. (454° to 538° C.), and more advantageously from 875° to 950° F. (468° to 510° C.). The heat carrier solids are preferably inert and are selected from sand, steel, ceramic balls, and coarse spent shale of approximately the same size range as the shale particles, with coarse spent shale particles being preferred.

If the retorting zone is indirectly heated, a stripping or fluidizing gas may be introduced at the lower portion of retort 21 via line 24. This gas may be selected from $H_2$, $CO$, $CO_2$, $C_1$-$C_3$ hydrocarbons, $N_2$, flue gas and steam. This gas may be used to fluidize a portion of the solid materials in the retorting zone if such is necessary, and to strip adsorbed hydrocarbons and any remaining hydrocarbonaceous vapors from the voids of the solids as they pass downwardly to the column before the solids are withdrawn via line 29.

A stream containing hydrocarbonaceous vapors and entrained solids in an amount generally from 500–900 grains/ft$^3$ (1100–2100 g/m$^3$), and in this case about 700 grains/ft$^3$ (1600 g/m$^3$) of vapor at the retorting conditions and having a vapor density at the broad conditions generally in the range of 640 to 960 g/m$^3$ (0.04 to 0.06 lbs/ft$^3$) and in this case about 810 g/m$^3$ (0.0506 lbs/ft$^3$) is withdrawn from the retorting zone via line 25 and passed to a conventional solids separator such as cyclone separator 26 to remove larger-sized entrained solids. This stream may also contain gas introduced into the retorting zone via line 24, but the stream as a whole will be referred to herein as the hydrocarbonaceous vapor stream.

The hydrocarbonaceous vapor stream from the cyclone separators, which generally contains from 6 to 15 grains/ft$^3$ (13 to 34 g/m$^3$) and in this case about 9 grains/ft$^3$ (20 g/m$^3$) of finely divided solids (2.5 weight percent solids in the resulting shale oil), is passed to annular vapor distributor zone 50 of granular filtration zone 47. A mixture of retorted shale particles and heat carrier solids is withdrawn from retorting zone 21 at substantially the retorting temperature and passed via line 41 to the top of granular filtration zone 47, and downwardly therethrough in an annular ring at a rate from 7.6 to 1220 cm per hour (¼ to 40 feet per hour). The hydrocarbonaceous vapor stream is passed transversely through the annular bed of contact material 51 causing the finely divided solids entrained in the vapor stream to lodge in the contact material. Hydrocarbonaceous vapors substantially free of finely divided solids, usually containing from 0.5 to 0.9 g/m$^3$ solids and in this instance containing 0.65 g/m$^3$ solids (respectively 600 to 1100 and 800 ppm solids in the resulting shale oil) are withdrawn from granular filtration zone 47 through central passageway 52 and line 55. From the bottom of filtration zone 47 is withdrawn a mixture of contact material and finely divided solids which is passed via line 57 back to retorting zone 21. However, if desired, all or a portion of the mixture of contact material and fines may be removed from the process via line 58.

The amount of shale passed through the granular filtration zone is approximately 6 to 10 weight percent of the combined weight of the heat carrier particles and raw shale particles charged to the retorting zone, but this figure may vary from 3 to 20 weight percent or more, depending upon the volume of the vapor or gas being filtered, the amount of entrained solids to be removed, the heat carrier particles recycle rate and the number of beds of contact material used in the granular filtration zone.

Referring now to FIG. 2, there is shown a retorting zone, a combustion zone and a granular filtration zone. Crushed raw shale is passed into retorting zone 121 via line 122 and a non-oxidizing stripping and fluidizing gas is introduced via line 124. Hydrocarbonaceous vapors containing entrained solids are passed through multiple cyclones 126 and withdrawn from the retorting zone via line 127. A stream of solids including heat carrier particles and retorted shale particles is withdrawn from retorting zone 121 via line 129 and passed to combustion zone 131. If desired, a portion of the solids stream may be removed from the system via line 130.

An oxidizing gas, preferably air, is passed into combustion zone 131 via line 132, and carbonaceous material on the retorted shale particles is combusted to bring the mass of solids to a temperature within the range of 1100° to 1600° F. (571° to 871° C.). A mixture of flue gas and heated solids is removed from the combustion zone via line 134 and passed to fines separation and solids surge zone 137. In separation and surge zone 137, flue gas and finely divided solids are removed via line 138 and the heat carrier solids are passed to retorting zone 121 via line 140. If desired, a portion of the mixture of heated solids may be remoed from the system via line 135.

A mixture of retorted solids and heat carrier particles is withdrawn from the bottom of retorting zone 121 and passed via line 141 to annular bed of contact material 151 in granular filtration zone 147. The hydrocarbonaceous vapor stream containing entrained solids in line 127 is passed into annular vapor distribution zone 150 surrounding the annular bed of contact material 151, transversely through the bed and removed from central passageway 152 via line 155, at which point the hydrocarbonaceous vapor stream contains less than 800 ppm solids.

The contact material in annular bed 151 is removed via line 157 or 158 either continuously or periodically so as to maintain downward rate of movement of the contact material between 7.6 and 1220 cm per hour ($\frac{1}{4}$ to 40 feet per hour). If desired, the contact material may be stripped of hydrocarbonaceous vapors and adsorbed hydrocarbons with an inert gas such as steam or nitrogen introduced via line 159 before the contact material is withdrawn via line 158 or passed to the combustor via lines 157 and 129.

Referring to FIG. 3, retorting zone 221 is charged with crushed shale via line 222 and solid heat carrier particles via line 240. A stripping gas is introduced into the retorting zone via line 224. A stream comprising hydrocarbonaceous vapors and entrained solids passes through cyclone separators 226 which serve to remove substantially all particles larger than 10 microns from the hydrocarbonaceous vapor stream before it is removed from the retorting zone via line 227. The solids stream, comprising retorted shale particles and heat carrier particles, is withdrawn from retorting zone 221 via line 229 and passed into combustion zone 231. If desired, a portion of the solids stream may be withdrawn before the combustor via line 230.

An oxygen-containing gas is charged to combustion zone 231 via line 232 whereby coke on the retorted shale particles is burned, thus elevating the temperature of the solids to within the range of 1100° to 1600° F. (571°–871° C.). These heated solids and flue gas are withdrawn from combustion zone 231 via line 234 and passed into fines separation and solids surge zone 237.

In separation zone 237, flue gas and finely divided solids are removed via line 238 while a major portion of the heat carrier particles is returned to retorting zone 221 via line 240. If desired, a portion of the solids may be withdrawn from the system via line 235. Another portion, approximately 6 to 10 weight percent of the recycled heat carrier particles, is passed via line 241 and cooled to approximately the retorting temperature in heat exchange zone 243, for example by heating a fluid in conduit 244. Heat carrier particles cooled to about 930° F. (499° C.) are removed from heat exchange zone 243 via lines 245 and passed to annular bed 251 of granular filtration zone 247. The stream in line 227 containing hydrocarbonaceous vapors and entrained finely divided solids is passed into annular vapor distribution zone 250 of granular filtration zone 247, transversly through annular bed 251 of contact material and into central portion 252 from which the vapor is withdrawn via line 255. Solid contact material is passed downwardly through granular filtration zone 247 and withdrawn therefrom via line 258 and discarded or returned to combustion zone 231 via line 257 and 229.

It will be recognized by those skilled in the art that the combustion zone need not be separate from the retorting zone. The combustion zone may be contiguous with the retorting zone, e.g., below it as shown in U.S. Ser. No. 811,496. In such cases, oxidizing gas introduced into the combustion zone may function as the fluidizing or stripping gas as it passes from the combustion zone into the retorting zone, and the introduction of a non-oxidizing gas to the retort may not be necessary. However, when the retort is directly heated, as in U.S. Ser. No. 811,496, the mixture of contact material and finely divided solids should be discarded and not returned to the process because of the possibility of fines build-up.

The method of the present invention is useful in retorting processes in which raw shale particles are heated by heat carrier particles and in which the heat carrier particles, retorted hydrocarbon-containing particles or both are predominantly under 8 millimeters in size and greater than 75 microns in size. Preferably, the contact material is predominantly within the range from 200 microns to 5 millimeters in size. By "predominantly" is meant that at least 75% of the particles used as contact material fall in this size range, and preferably 90% or more. Examples of suitable retorting processes include those described in U.S. Ser. Nos. 802,999, 811,496, 889,156, and 891,084; U.S. Pat. Nos. 4,056,461, 4,087,347 and 4,125,453; and the Lurgi Ruhrgas "Sand Cracker" shale retort in which retorting is carried out in a sealed screw-type conveyor.

An important feature of a granular filtration zone is that a vapor stream containing entrained finely divided solids is passed transversly through a downwardly moving bed of contact material such that a substantial portion, such as at least 80%, and preferably 90 or 95% or more, of the entrained solids are trapped in the moving bed of contact material. It is not necessary for the bed of contact material to be annular in shape; it may be any convenient shape, for example rectangular, with the vapor stream passing from one side to the other, or polygonal with an interior or central vapor removal zone.

Suitable solids flow velocities are from 7.6 to 1220 cm per hour (¼ to 40 feet per hour), with from 150 to 915 cm per hour (5 to 30 feet per hour) being especially suitable.

The calculated pressure drop of the vapor through each bed of contact material at the described conditions is approximately 90 cm (35 inches) of water. The separation efficiency of a filtration zone is calculated for a filtration zone having one bed and two beds in series as shown in the following Table I.

TABLE I

| Particle Size Microns | Size Distribution of Fines in Retorted Vapor | Vapor from Cyclones ppmw Fines | Vapor from 1st Filter ppmw Fines | Vapor from 2nd Filter ppmw Fines | Fines Removal Efficiency, % | |
|---|---|---|---|---|---|---|
| | | | | | 1 Filter | 2 Filters |
| 0.4-0.7 | 0.8% | 9,600 | 590 | 35 | 93.9 | 99.6 |
| 0.7-1 | 1.5% | 10,600 | 140 | 2 | 98.7 | 99.9+ |
| 1-2 | 6.8% | 17,500 | 170 | 2 | 99.0 | 99.9+ |
| 2-4 | 10.9 | 10,500 | 190 | 4 | 98.2 | 99.9+ |
| 4-6 | 10.9% | 700 | 10 | 0 | 98.6 | 99.9+ |
| 6-8 | 11.1% | 0 | 0 | 0 | — | — |
| 8-10 | 5.8% | 0 | 0 | 0 | — | — |
| 10+ | 52.2% | 0 | 0 | 0 | — | — |

In any event, the rate of solids removal should be sufficient to prevent the finely divided solids from plugging the bed. The superficial gas velocity of the vapors across the bed should be between 30.5 and 1525 cm per second (1 to 50 feet per second), and preferably from 90 to 610 cm per second (3 to 20 feet per second); however, this velocity can be varied over a considerable range. The pressure drop experienced by the vapor across one bed of contact material will ordinarily be in the range from 12 to 125 cm (5 to 50 inches) of water with higher pressure drops attended by higher efficiency of separation. A suitable pressure drop will depend upon the particular unit.

The area of contact of the contaminated vapor with the contact material may also vary widely. Depending upon the superficial gas velocity, size of contact material, rate of downward movement of the contact material and the desired pressure drop, the depth of the contact material through which the gas must flow may vary anywhere from several centimeters to a meter or more, and preferably will be from 30 to 50 cm (1 to 1.5 feet).

EXAMPLE

This example illustrates the expected efficiency of a granular filtration zone having one bed and having two beds in series for removing suspended fines from hydrocarbonaceous vapor. The calculations are based upon a shale retort designed to produce 50,000 barrels (7950 m³) of shale oil per operating day, or 21,800,000 lbs (9,910,000 kg) per day of hydrocarbonaceous vapor comprising 78% shale oil vapor, 12% light gases and 10% water vapor, and having an average molecular weight of 48 and a density of 0.0505 lb/ft³ (0.809 kg/m³). The hydrocarbonaceous vapor contains entrained, finely divided solids as detailed in Table I. The vapor is passed through a series of three high-efficiency cyclone separators and then in series through two beds of a granular filtration zone.

The hydrocarbonaceous vapor is passed at a superficial gas velocity of 9.15 m (30 feet) per second transversely through two beds of contact material, each having an outer surface area of 13.95 m² (150 ft²) and a depth of 30.5 cm (1 ft). The contact material moves downwardly in each bed by gravity flow at approximately 8.3 m/hr (27 ft/hr) and each represents approximately 10% by weight of the heat carrier particles of the size from 600 to 1200 microns that are removed from the combustion zone.

The over-all efficiency of removal of the finely divided particles from the hydrocarbonaceous vapors is approximately 97-98% for a single-bed granular filtration zone, and the resulting filtered hydrocarbonaceous vapor stream contains about 0.1 weight percent solids. For a two-bed granular filtration zone, the amount of finely divided solids in the filtered hydrocarbonaceous vapor would be reduced to approximately 45 ppm. A third granular filter bed in series with the first two would reduce the amount of entrained solids in the hydrocarbonaceous vapor to below 10 ppm, well within the range at which the hydrocarbon would be suitable for downstream processing.

An advantage of the present invention is that the granular filtration zone can remove finely divided solids from a hydrocarbonaceous vapor stream before the stream is condensed, thus eliminating an otherwise costly step of coking or filtering the condensed shale oil. To prevent condensation or cracking of the hydrocarbonaceous vapor stream, the contact material should be at approximately the retorting temperature. Particles suitable for contact material may be found at several locations in the shale retort or shale retort-combustor. Specifically, retorted shale particles, heat carrier particles (which may need cooling) or a mixture of retorted particles and heat carrier particles may be taken from the retorting zone, from the solids effluent of the retorting zone or from the combustion zone and used as the contact material. By using contact material from these sources, a step for heating the contact material is not necessary, with the resulting savings of capital and energy costs associated with heating contact material to approximately the retorting temperature.

Another advantage of the present invention is that no separate regeneration step for the contact material is necessary. The fines-laden contact material can be either disposed of along with the spent or retorted shale or, if the fines-laden contact material is passed to a combustion zone, the fines will be removed from the flue gas together with other fines by conventional separation means such as cyclone separators and bag filters. No separate steps (or the associated equipment) for removing and collecting the fines are needed with the present invention, and the expense of the associated solids handling is not incurred.

Although only specific arrangements and modes of construction and operation of the present invention have been described and illustrated, numerous changes could be made in those arrangements and modes without departing from the spirit of the invention, and all of such changes that fall within the scope of the appended claims are intended to be embraced thereby.

What is claimed is:

1. In a retorting process wherein raw hydrocarbon-containing particles are introduced into a retorting zone and retorted therein to form retorted solids and hydrocarbonaceous vapors by heating said particles to retorting temperatures by heat transfer from solid heat carrier particles passed through the retorting zone; and a stream comprising said hydrocarbonaceous vapors contaminated with entrained finely divided solids is withdrawn from the retorting zone; the improved method of removing at least a portion of said entrained finely divided solids from said hydrocarbonaceous vapors which comprises:

(a) introducing solid contact material predominantly of a size in the range from 75 microns to 8 millimeters and at a temperature within the range from 25° C. (45° F.) below the retorting temperature to 55° C. (100° F.) above the retorting temperature to an upper portion of a granular filtration zone, said solid contact material being selected from the group consisting of retorted solids, heat carrier particles and mixtures of retorted solids and heat carrier particles;

(b) passing said solid contact material downwardly through said filtration zone as a bed of contiguous particles at a velocity in the range of 7.6 to 1220 cm per hour;

(c) passing said stream at substantially said retorting temperature transversely through said bed whereby at least a portion of said finely divided solids is deposited in said bed; and (d) withdrawing a mixture said of contact material and said finely divided solids from a lower portion of said filtration zone.

2. The process of claim 1 further comprising removing hydrocarbonaceous vapors and adsorbed hydrocarbons from said mixture of contact material and finely divided solids by stripping said mixture of contact material and finely divided solids with an inert gas.

3. The process of claim 1 wherein said contact material in said bed is at a temperature within the range of 10° C. (18° F.) below the retorting temperature to 25° C. (45° F.) above the retorting temperature.

4. The process of claim 1 further comprising passing said mixture of contact material and finely divided solids to said retorting zone.

5. In a retorting process wherein raw hydrocarbon-containing particles are introduced into a retorting zone and retorted therein to form retorted solids and hydrocarbonaceous vapors by heating said particles to retorting temperatures by heat transfer from solid heat carrier particles passed through the retorting zone, a stream comprising hydrocarbonaceous vapors contaminated with entrained finely divided solids is withdrawn from the retorting zone, a stream of solids including heat carrier particles and retorted solids is withdrawn from the retorting zone and at least a portion of said solids stream, including solids containing residual hydrocarbonaceous material, is passed to a combustion zone and there contacted with an oxygen-containing gas under combustion conditions, thereby heating the solids stream, and the resulting heated solids are withdrawn from the combustion zone and at least a portion of said heated solids stream recycled as said heat carrier particles;

the improved method of removing at least a portion of said entrained finely divided solids from said hydrocarbonaceous stream which comprises:

(a) introducing said contact material predominantly of a size in the range from 75 microns to 8 millimeters and at a temperature within the range from 25° C. (45° F.) below the retorting temperature to 55° C. (100° F.) above the retorting temperature to an upper portion of a granular filtration zone, said solid contact material being selected from the group consisting of retorted solids, heat carrier particles and mixtures of retorted solids and heat carrier particles;

(b) passing said solid contact material downwardly through said filtration zone as a bed of contiguous particles at a velocity in the range of 7.6 to 1220 cm per hour;

(c) passing said stream at substantially said retorting temperature transversely through said bed whereby at least a portion of said finely divided solids is deposited in said bed; and (d) withdrawing a mixture of said contact material and said finely divided solids from a lower portion of said filtration zone.

6. The process of claim 5 further comprising passing said mixture of contact material and finely divided solids to said combustion zone.

7. The process of claim 5 further comprising passing said mixture of contact material and finely divided solids to said retorting zone.

8. The process of claim 5 further comprising removing hydrocarbonaceous vapors and adsorbed hydrocarbons from said mixture of contact material and finely divided solids by stripping said mixture of contact material and finely divided solids with an inert gas.

9. The process of claim 5 wherein said contact material in said bed is at a temperature within the range of 10° C. (18° F.) below the retorting temperature to 25° C. (45° F.) above the retorting temperature.

10. The process of claim 5 wherein said contact material is predominantly of a size within the range from 200 microns to 5 millimeters.

* * * * *

UNITED STATES PATENT AND TRADEMARK OFFICE
CERTIFICATE OF CORRECTION

PATENT NO. : 4,230,557
DATED : October 28, 1980
INVENTOR(S) : Corey A. Bertelsen & Byron G. Spars It is certified that error appears in the above–identified patent and that said Letters Patent are hereby corrected as shown below:

Col. 1, line 29, "particlees" should read --particles--.

Col. 1, line 40, "entraind" should read --entrained--.

Col. 5, line 32, "remoed" should read --removed--.

Col. 6, line 29, "line" should read --lines--.

Col. 10, line 16, Claim 5, "said" should read --solid--.

Signed and Sealed this

Seventeenth Day of March 1981

[SEAL]

Attest:

RENE D. TEGTMEYER

Attesting Officer   Acting Commissioner of Patents and Trademarks